July 29, 1969  V. SHANOK ET AL  3,458,386

DECORATIVE TRIM STRIP AND METHOD OF MAKING SAME

Filed March 26, 1964

INVENTORS
VICTOR SHANOK
JESSE P. SHANOK

BY Friedman & Goodman
ATTORNEYS

United States Patent Office 3,458,386
Patented July 29, 1969

3,458,386
DECORATIVE TRIM STRIP AND METHOD
OF MAKING SAME
Victor Shanok and Jesse P. Shanok, Brooklyn, N.Y., assignors to Glass Laboratories Company, Brooklyn, N.Y., a limited partnership of New York
Filed Mar. 26, 1964, Ser. No. 354,889
Int. Cl. B32b 3/06
U.S. Cl. 161—121       2 Claims

ABSTRACT OF THE DISCLOSURE

This invention concerns a trim strip comprising an elongated base of a rigid plastic material and a decorative facing strip secured thereto along at least one longitudinally extending surface, said facing strip being formed of a flexible plastic material having a decorative pattern provided thereon.

---

The present invention relates to decorative strip material, particularly strips having the appearance and function of wooden molding and to a method for fabricating such material.

It is an object of the present invention to provide a highly novel trim strip in which the decorative foil provided, for example, with a decoration in the form of a wooden surface, is suitably mounted on a base which provides the rigidity needed by the overall strip and which nevertheless does not interfere with the flexible and other characteristics of the decorative foil.

It is another object of the present invention to provide a composite trim strip of the foregoing character which can be manufactured and sold at a relatively low cost.

It is a further object of the present invention to provide highly novel and simplified method for fabricating trim strips of the described type.

It is a still further object of the present invention to provide such a method which can be performed by conventional mechanisms in a mass production technique so that the trim strip may be fabricated in relatively large quantities so as to provide a relatively low cost therefor.

Other and further objects and advantages of the present invention will be readily apparent to one skilled in the art from a consideration of the following specification taken in connection with the appended drawing which illustrates the best mode presently contemplated for carrying out the invention.

Figure 1:
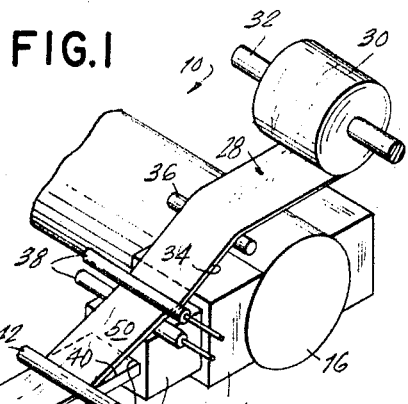
FIGURE 1 is a perspective view of an apparatus for providing a trim strip pursuant to the present invention.
Figure 2:
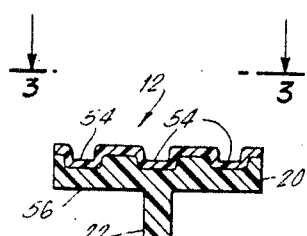
FIGURE 2 is a sectional view on an enlarged scale as seen from line 2—2 of FIGURE 1.

Referring now to FIGURE 1 of the drawing in detail, there is shown an apparatus generally indicated by the reference numeral 10 for fabricating a continuous trim strip 12 of the type illustrated in FIGURE 2. As here shown, the plastic extrusion apparatus 10 comprises an extrusion crosshead 14 which is provided with an extrusion barrel 16 and which mounts an extrusion nozzle 18.

The nozzle 18 extrudes an elongated base strip 20 which, as here shown, is preferably provided with a stem 22 for mounting the base strip as an edging in the groove of a suitable support. The base strip is formed of a suitable material so that the base strip is a longitudinally flexible plastic material which, however, is relatively rigid in its transverse dimension. Any suitable rigid thermo-plastic material may be used for the base material, preferably cellulose acetate butyrate is utilized for the purpose so as to provide a base strip having the foregoing characteristics, namely, one which is longitudinally flexible to the desired degree but which is relatively rigid in its transverse dimension. As here shown, the base strip 20 is extruded upon a pair of elongated laterally spaced supports 24 and 26 which are laterally spaced sufficiently to accommodate the extruded stem 22 therebetween. It will be understood that the supports 24 and 26 provide the needed support for the further operations hereinafter described.

Pursuant to the present invention, provision is made to mount a supply or roll of facing strip material 28 in position relative to the extrusion apparatus 10. As here shown, the supply roll 30 of the decorative strip or foil material 28 feeds from and is mounted by a suitable support 32 positioned adjacent to the extrusion apparatus 10. The facing strip is formed of a suitable material, preferably plasticized polyvinyl chloride or copolymers thereof, which is in the form of a relatively thin film and which is flexible as well as stretchable both longitudinally and laterally thereof. The strip 28 is provided with a suitable decoration, preferably as here shown, a decoration which gives the decorative strip 28 the appearance of a wood surface. The said decoration is advantageously provided on strip 28, along the lower or bottom surface 34 thereof viewing FIGURE 1.

As here shown, the facing strip 28 is fed from the supply roll 30 thereof over a guide roller 36 and passes between a pair of feed rollers 38. It will be noted that the feed rollers 38 are disposed in relatively close proximity to the crosshead 14 of the extrusion apparatus 10 for a purpose hereinafter described. In this connection, it will be understood that the under or decorated surface 34 of the decorative strip 28 is provided with a suitable adhesive coating which is of the heat-sensitive type or thermo-plastic. It will be understood that the adhesive coating may be softened and rendered relatively tacky by the radiant heat emanating from the cross head 14 of the extrusion apparatus 10 where this is desired. The degree to which the adhesive surface of the facing strip is pre-activated may be controlled by adjusting the distance between the feed rollers 38 and the extrusion head.

It is also a feature of this invention that pre-activation of the adhesive material may be completely eliminated by increasing the distance of the feed rollers 38 from the extrusion head to a sufficient degree. Under these circumstances the heat of the base strip completely activates the adhesive.

The base strip 20 as it issues from the extrusion nozzle 18 is provided with a planar upper surface 40. As will be noted from FIGURE 1, the decorative strip 28 advances through the feed rollers 38 so as to overlie the planar upper surface 40 of the extruded base strip 20. More specifically, the decorative and adhesive covered bottom or inner surface 34 of the facing strip 28 overlies the planar upper surface 40 of the base strip 20 and said confronting surfaces are moved into mutual abutment by means of the pressure roller 42. In the case where the surface 34 is provided with a heat-sensitive or thermoplastic adhesive coating which has been softened or rendered tacky by the radiant heat emerging from the extrusion cross head 14, the pressure roller 42 will be effective to provide sufficient pressure so that the adhesive will adhere to and bond with the underlying upper planar surface 40 so as to bond the decorative facing strip 28 to the underlying planar surface 40 as the upper strip 28 and the lower strip 20 pass or travel in the direction of the arrow 44 outwardly or forwardly from the pressure roller 42. In this connection, it will be apparent that the support strips 24 and 26 provide the necessary support at the under surface of the strip 20 to oppose the force applied by the pressure roller 42. The pressure roller 42 similarly provides the desired pressure to form the bond when the sole activating agent for the adhesive is the temperature of the extruded base strip.

Figure 3:
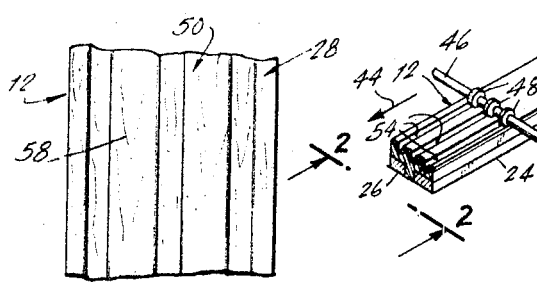
FIGURE 3 is a top plan view of the trim strip illustrated in FIGURE 2.

The composite trim strip 12 provided by the extrusion apparatus 10 is illustrated in FIGURES 2 and 3. It will be noted that the trim strip 12 is a highly decorative element, being formed with the embossments or furrows 54 in the upper surface thereof, which upper surface has the appearance of a wooden surface due to the fact that the imitation wood grain decoration generally indicated by the reference numeral 56 at the lower surface 34 of the facing strip 28 is visible through the transparent material of which the facing strip is formed. The trim strip 12 may be readily mounted on and secured to a suitable underlying base or support which it is desired to provide with the appearance of a wood surface decoration, by inserting the stem 22 in a suitable complementary groove or recess defined in said support. Due to the fact that the base 20 is flexible and elastic, the strip 12 will conform and follow the surface of the underlying support to which it may be secured. The completely flexible nature of the facing strip 28 will follow the longitudinal flexure of the base strip 20. In addition, due to the fact that the facing strip 28 is flexible or stretchable, the furrows or channels 54 may be readily defined therein and provided on the otherwise substantially planar upper surface of the base strip 20.

Figure 4:
FIGURE 4 is a view similar to FIGURE 2 and illustrates a basic form of trim strip produced in accordance with the present invention.

Referring now to FIGURE 4 in detail, there is shown a basic form of trim strip which is generally indicated by the reference numeral 60. The trim strip 60 is formed substantially in the same manner as the trim strip 12 but it is not subjected to the action of the embossing roller 46. More specifically, in forming the trim strip 60, the base strip 20A is provided with a channel 62 in its upper planar surface as it issues from the extrusion orifice 52 which channel extends longitudinally of the base strip. The facing strip 28 is securely mounted within the channel 62. In all other respects the trim strip 60 is similar to the trim strip 12. The possibility of the facing strip being damaged or lifted along its edges is thus eliminated and the appearance of the composite strip is enhanced by the exposed plastic along the edges.

Figure 5:
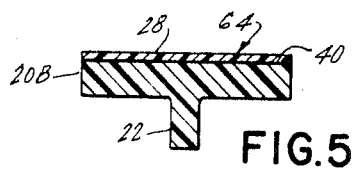
FIGURE 5 is a view similar to FIGURE 2 and illustrates a further form of trim strip produced in accordance with the present invention.

Referring now to FIGURE 5 in detail, there is shown another form of trim strip which is designated generally by the reference numeral 64. The trim strip 64 is provided neither with the furrows 54 of the trim strip 12 nor with the channel 62 of the trim strip 60. In the case of the trim strip 64, the facing foil 28 is secured directly on the completely planar upper surface 40 of the base strip 20 as it issues from the extrusion orifice 52 and is not subjected to the action of an embossing roller 46. In all other respects the trim strip 64 is similar to the trim strips 12 and 60.

Figure 7:
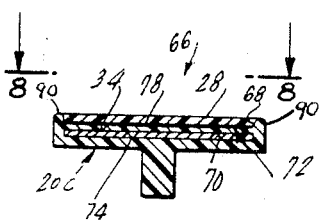
FIGURE 7 is a view similar to FIGURE 2 and illustrates the trim strip provided by the apparatus of FIGURE 6.
Figure 8:
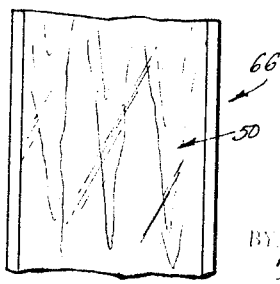
FIGURE 8 is a top plan view of the trim strip illustrated in FIGURE 7.

Referring now to FIGURES 7 and 8 in detail, there is shown another form of trim strip 66 provided pursuant to the present invention. As here shown, the trim strip 66 comprises a base strip 20C which differs from the base strip 20A of FIGURE 4 and base strip 20B of FIGURE 5 in that the base strip 20C is provided with a preferably metallic strip or foil 74. More specifically, strip 74 is encased or sheathed by the base strip 20A. As here shown, strip 74 is fed from a supply roll 84 thereof, mounted on a support bar 80, in the direction of arrow 88 into the extruder 14. The extruder is effective to extrude the material forming the base strip 20C about the strip 74 so as to encase the latter within the base strip 20A. As here shown, the material of which the base strip 20C is formed completely encases the metallic strip 74 so that the confronting surfaces of the encased strip and the encasing material are in abutment, as indicated at 70. The metallic strip 74 provides sufficient rigidity to the base strip 20C to support the latter as it issues from the extruder. The base strip 20C is provided with a channel 68 having raised side edges 90—90 and as it issues from the extruder, the decorative strip 72, which is similar to the decorative strip 28, is deposited on the upper surface thereof, between raised edges 90—90, and secured thereto by the adhesive coating 78 which is rendered tacky by the radiated heat of the extruder, as previously described.

Figure 6:
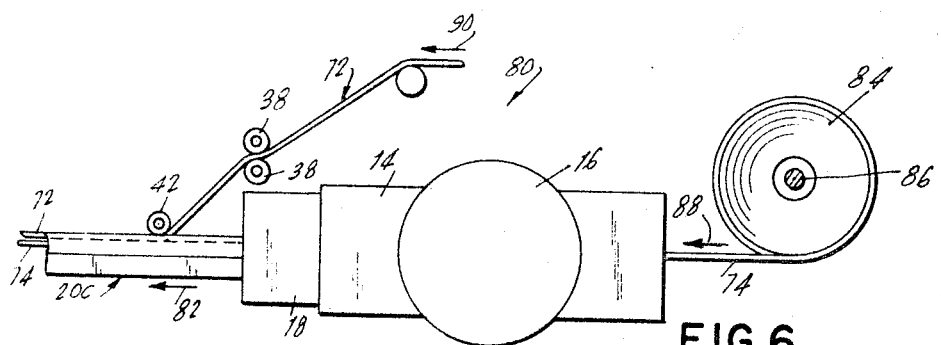
FIGURE 6 is an elevation view of an apparatus for providing another form of trim strip pursuant to the present invention.

The trim strip 66 is produced by the extrusion apparatus 80 illustrated in FIGURE 6. Said extrusion apparatus is provided also with an extrusion cross head 14, and extrusion barrel 16 and an extrusion nozzle 18. The extrusion nozzle 18 extrudes the base strip 20C provided with the channel 68 provided at the upper surface thereof, the base strip being extruded in the direction of the arrow 82. As previously indicated, the foil strip 72 is provided on a roll or supply 84 thereof and is mounted on a suitable support 86 so that the foil strip travels in the direction of the arrow 88 through the extruder 80 to be deposited in the channel 68. The facing strip 72 is supplied to the extrusion device 80 in the same manner as supplied to the extrusion device 10. More specifically, the decorative strip 72 travels in the direction of the arrow 90 from its supply roll 30 over the guide roller 36 between the feed rolls 38 at which it is positioned adjacent to the cross head 14 and then travels from the feed rolls underneath the pressure roller 42 at which point it is bonded to the underlying surface of the channel 60 defined in the base strip 20C.

In view of the foregoing, it will be readily apparent that there has been illustrated and described a highly novel trim strip which can be produced by mass production techniques from conventional extrusion apparatus. It will be understood that various changes and modifications may be made both within the method for fabricating the trim strip of the present invention as well as within the trim strip itself, without, however, departing from the basic inventive concept set forth in the appended claims.

What is claimed is:

1. A trim strip comprising an elongated base strip of relatively rigid plastic material and a decorative facing strip secured thereto along at least one longitudinally extending surface, said facing strip being formed of a relatively flexible plastic material having a decorative pattern provided thereon, and means defining longitudinal furrows in said facing strip and said base strip.

2. The method of forming a trim strip which comprises extruding a thermoplastic synthetic resin in strip form and bonding a facing strip to said extrusion immediately upon emergence from the extrusion orifice, and embossing said trim before said synthetic resin hardens.

References Cited

UNITED STATES PATENTS

| | | | |
|---|---|---|---|
| 2,311,156 | 2/1943 | Casto | 161—413 |
| 3,013,919 | 12/1961 | Bialy | 161—164 |
| 3,024,147 | 3/1962 | Brooks et al. | 156—244 |
| 3,046,174 | 7/1962 | Brooks et al. | 156—244 |
| 3,136,676 | 6/1964 | Fisch | 156—244 |
| 3,138,834 | 6/1964 | Shanok | 156—244 |
| 3,234,066 | 2/1966 | Mulholland | 156—244 |

EARL M. BERGERT, Primary Examiner

T. R. SAVOIE, Assistant Examiner

U.S. Cl. X.R.

52—312; 156—209, 244; 161—413